United States Patent [19]

DuCharme, Jr. et al.

[11] Patent Number: 5,603,884
[45] Date of Patent: Feb. 18, 1997

[54] REINFORCED CELLULOSIC FILM

[75] Inventors: Paul E. DuCharme, Jr., Tinley Park; Norman A. Protnoy, Clarendon Hills; John Markulin, Oak Lawn; Myron D. Nicholson, Lemont, all of Ill.

[73] Assignee: Viskase Corporation, Chicago, Ill.

[21] Appl. No.: 342,287

[22] Filed: Nov. 18, 1994

[51] Int. Cl.$^6$ .................................................. D01D 5/00
[52] U.S. Cl. ........................................ 264/203; 264/209.1
[58] Field of Search .............................. 524/31; 264/203, 264/209.1

[56] References Cited

U.S. PATENT DOCUMENTS

| | | |
|---|---|---|
| 2,070,247 | 2/1937 | Weingand et al. . |
| 2,141,776 | 12/1938 | Vautier et al. . |
| 2,144,899 | 1/1939 | Smith . |
| 2,172,426 | 9/1939 | Weingand et al. . |
| 2,176,925 | 3/1939 | Reichel et al. . |
| 2,179,181 | 11/1939 | Graenacher et al. . |
| 2,227,682 | 1/1941 | Wade . |
| 2,346,417 | 4/1944 | Cornwell et al. . |
| 2,901,358 | 8/1959 | Underwood et al. . |
| 3,106,471 | 10/1963 | Firth . |
| 3,158,492 | 11/1964 | Firth . |
| 3,307,956 | 3/1967 | Chiu et al. . |
| 3,334,168 | 12/1963 | Majewski et al. . |
| 3,402,682 | 9/1968 | Peden et al. . |
| 3,442,663 | 5/1969 | Turbak . |
| 3,447,939 | 6/1969 | Johnson . |
| 3,551,535 | 12/1970 | Henderson et al. . |
| 3,558,331 | 1/1971 | Tarika . |
| 3,898,348 | 8/1975 | Chiu et al. . |
| 3,905,397 | 9/1975 | Chiu . |
| 3,981,046 | 9/1976 | Chiu . |
| 4,060,361 | 11/1977 | Ziolko . |
| 4,061,787 | 12/1977 | Higgins . |
| 4,137,947 | 2/1979 | Bridgeford . |
| 4,138,503 | 2/1979 | Ziolko . |
| 4,142,913 | 3/1979 | McCorsley, III et al. . |
| 4,144,080 | 3/1979 | McCorsley, III . |
| 4,145,532 | 3/1979 | Franks et al. . |
| 4,195,054 | 3/1980 | Verellen et al. . |
| 4,196,282 | 4/1980 | Franks . |
| 4,211,574 | 7/1980 | McCorsley et al. . |
| 4,218,286 | 8/1980 | Jones et al. . |
| 4,246,221 | 1/1981 | McCorsley, III . |
| 4,255,300 | 3/1981 | Franks et al. ............................ 524/35 |
| 4,261,943 | 4/1981 | McCorsley, III . |
| 4,317,794 | 3/1982 | Gord et al. . |
| 4,323,627 | 4/1982 | Joh . |
| 4,324,593 | 4/1982 | Varga . |
| 4,354,938 | 10/1982 | Walch et al. . |
| 4,356,218 | 10/1982 | Chiu . |
| 4,378,017 | 3/1983 | Kosugi et al. . |
| 4,409,251 | 10/1983 | Higgins . |
| 4,416,698 | 11/1983 | McCorsley, III . |
| 4,426,228 | 1/1984 | Brander et al. . |
| 4,489,114 | 12/1984 | Bridgeford . |
| 4,511,613 | 4/1985 | Nicholson . |
| 4,540,613 | 9/1985 | Nicholson . |
| 4,590,107 | 5/1986 | Bridgefold . |
| 4,596,727 | 6/1986 | Higgins et al. . |
| 4,814,034 | 3/1989 | Hansen et al. . |
| 4,952,431 | 10/1990 | Robertson et al. . |
| 5,216,144 | 1/1993 | Eichinger . |
| 5,252,284 | 10/1993 | Jurkovic . |
| 5,277,857 | 1/1994 | Nicholson et al. . |
| 5,295,514 | 3/1994 | Bridgeford et al. . |
| 5,358,765 | 10/1994 | Markulin . |

FOREIGN PATENT DOCUMENTS

| | | |
|---|---|---|
| 1089700 | 11/1980 | Canada . |
| 1171615 | 7/1984 | Canada . |
| 2057133 | 6/1992 | Canada . |
| 006601 | 1/1980 | European Pat. Off. . |
| 494852 | 7/1992 | European Pat. Off. . |
| 494851 | 7/1992 | European Pat. Off. . |
| 218121 | 1/1985 | German Dem. Rep. . |
| 55141 | of 1984 | Japan . |
| 1144759 | 3/1969 | United Kingdom . |

OTHER PUBLICATIONS

PCT International Search Report dated Apr. 29, 1993.

*Primary Examiner*—Jeffrey C. Mullis
*Attorney, Agent, or Firm*—Roger Aceto

[57] ABSTRACT

Disclosed is a method of preparing an extruded cellulosic film which contains a uniform dispersion of hemp fibers by first adding the fibers to an amine oxide cellulose solvent to form a slurry, mixing the slurry with a molten aqueous solution of cellulose and amine oxide cellulose solvent extruding the mixture end then regenerating the dissolved cellulose.

12 Claims, No Drawings

REINFORCED CELLULOSIC FILM

FIELD OF THE INVENTION

The present invention relates to compounded fibrous dope compositions of amine oxide cellulose solutions having a uniformly dispersed second fibrous material, methods of producing the compositions, and shaped articles such as fibers, paper, films, and food casings produced from the compositions.

BACKGROUND OF THE INVENTION

Cellulose is a natural polymer that has been used for centuries to make various forms of paper. More recently, it has been chemically regenerated to make fibers, transparent paper, cellophane, films, and casings for industrial and food related uses. These cellulose-based casings are well known for use in food products, such as sausages. Cellulose fibers have also been treated and reformed as webbed paper products where the individual cellulose fibers are physically brought together, for example, by needle punching, and form products such as non-woven sheets and towels.

The regenerated cellulose polymer used for making both casings and films is most commonly produced by the well known viscose process. A natural cellulose, such as wood pulp or cotton linters, is treated with a caustic solution to activate the cellulose to permit derivatization and extract certain alkali soluble fractions from the natural cellulose. The resulting alkali cellulose is shredded, aged, and treated with carbon disulfide to form cellulose xanthate, a cellulose derivative. The cellulose xanthate is then dissolved in a weak caustic solution. The resulting solution, or viscose, is ripened, filtered, deaerated and extruded as a film or tube into coagulation and regenerating baths containing salts and sulfuric acid. In these acidic baths, the cellulose xanthate, e.g., viscose, is decomposed and hydrolyzed back to a pure form of cellulose. A drawback of this method is that undesirable side products, including sulfur, carbon disulfide and hydrogen sulfide, are produced.

Although the viscose process is the most commonly used process for the production of cellulose casing for the food processing industry, alternate methods have been described, in particular that described in U.S. Pat. No. 5,277,857. This alternate cellulose production method involves forming a polymeric solution by means of a simple dissolution of cellulose, rather than derivatization, to form a soluble substance. The cellulose dissolution process is described in U.S. Pat. No. 2,179,181. This patent describes the dissolution of natural cellulose by a tertiary amine oxide to produce solutions of relatively low solids content, for example, 7 to 10% by weight cellulose dissolved in 93 to 90% by weight of the tertiary amine. The cellulose in the resulting solution is nonderivatized prior to dissolution. U.S. Pat. No. 3,447,939 discloses use of N-methylmorpholine-N-oxide ("NMMO") as the amine oxide solvent of choice.

More recent patents, such as, U.S. Pat. No. 4,145,532 and U.S. Pat. No. 4,426,288, improve upon the teachings of the '939 patent. U.S. Pat. No. 4,145,532 discloses a process for making a solution of cellulose in a tertiary amine oxide, such as NMMO, that contains 10–35% by weight of cellulose. This higher solids content, achieved in part by including an amount of water (from 1.4% to about 29% by weight) in the tertiary amine oxide solvent, provides a solution adapted for shaping into a cellulosic article by extrusion into fibers, films, or casings. In U.S. Pat. No. 4,426,288, the NMMO-cellulose polymeric solution contains an additive that reduces decomposition of the cellulose polymer chain so that molding or spinning substances are obtained with only slight discoloration and that will yield molded shapes distinguished by improved strengths upon regeneration in a nonsolvent such as water.

Using NMMO as a solvent for cellulose eliminates the disadvantages attendant to the viscose process including the generation of toxic and noxious gases and sulfur compounds.

Cellulose food casings generally are made in a nonreinforced or a reinforced form. Nonreinforced casing consists of a tubular film of regenerated cellulose polymer having a wall thickness ranging from about 0.025 mm to about 0.076 mm and made in diameters of about 14.5 mm to about 203 mm.

Reinforced casings are commonly called "fibrous" casings to distinguish them from the nonreinforced cellulose casings. Here, a lighter viscosity viscose than is used for nonfibrous casing is extruded onto a sheet or tube of paper prior to entering the coagulation and regenerating baths. The result is that the regenerated cellulose impregnates and bonds to the paper substrate. Fibrous casings have a wall thickness in the range of 0.050 mm to 0.102 mm and are made in diameters of about 40.6 mm to 193 mm or greater. Fibrous casings have a dimensional stability that is greater than that found in nonreinforced casing. These casings are known for having enhanced wet strength and resistance to puncture and propagation of tears. As fibrous casings are stiffer and are less extensible than nonreinforced casings, they assure that once the casing is stuffed with meat each linear inch of casing will contain a specific weight of meat. This enables the sausage manufacturer to easily prepackage weights of sausage meat by number of slices instead of by weight. To the best of applicants knowledge, the method of making casing using the amine oxide solution as described in U.S. Pat. No. 5,277,857 has not been extended to making fibrous casings.

Another type of casing using "filled" systems that are well known in the art are collagen-based casings. Filled systems can be described as being composed of a basic material, such as collagen, that has another material added to it that never chemically bonds or becomes part of the first basic material. Often this system is used in order to improve the economics of the product by using a cheaper "filler" material with the more expensive basic material. The added material, up to a critical amount, may be able to add its properties to those of the basic material. However, when too much of the added material is present, it interferes with the properties of the basic material.

An example of such a system is polyvinylchloride ("PVC") polymer containing an additive to render pipe made from the PVC polymer resistant to degradation by sunlight. A small amount of the additive neither adds nor takes away from the strength of PVC pipe and additionally protects the pipe from degradation by sunlight. However, a large amount causes the PVC pipe to degrade as the continuity of the polymer is interrupted by the sheer amount of the protective additive.

In order to impart certain strength and handling characteristics to collagen casings, other non-collagen materials, such as, cellulose, acids, bases, salts, and rayon fibers have been added to the collagen prior to forming it into a casing. U.S. Pat. No. 4,378,017 describes and teaches a composite material of de-N-acetylated chitin and fibrous collagen that has excellent mechanical strength and heat-resistance, and which can be used as casing. U.S. Pat. No. 4,061,787 describes a collagen casing with improved strength characteristics containing a crosslinking agent that is a fatty acid or oil and the collagen.

An earlier U.S. Pat. No. 3,551,535, describes a method for making a homogeneous mixture of collagen, reactive materials and shrink control agents. Reactive materials are those that show chemical or physical action when brought together, such as, the swelling of collagen when in contact with an acid, base, or salt. Shrink control agents include cellulose fibers, rayon fibers, cotton fibers, alginates and starches. The compounds formed can be used for articles, such as, casings, shoes, gloves, medical sutures, and bandages.

Although use of a filled system can produce a collagen casing having attractive properties of strength, it has not been used with cellulosic casings.

By contrast, composite technology can be used to create composites where successive incremental additions of an added material to a high percentage of the overall composite do not cause the degradation of any salient property of these compositions. A "composite" is formed when a second material is added to a first material, such as a polymer, and not only does the added material not disrupt the integrity of the original polymer and the article formed from it, but can add its own characteristics to the polymer.

However, up until the present time, the only way to achieve improved properties of casings made from viscose has been by coating or bonding the viscose to a paper web. Although fibrous casing is generally satisfactory for the casing user, there are disadvantages for both the user and the manufacturer. Disadvantages for the casing manufacturer include the need to maintain a supply of paper web or sheet in addition to the viscose used for nonreinforced casing, supplier problems, running problems on the coating machines, and the need to make a uniform seam when the paper web is seamed. This seam must be uniform and cannot break apart when the casing is manufactured and stuffed with food under high pressure. The paper is generally a specialty item, hemp paper, and obtainable only from a limited number of suppliers. Differential tensions between the paper and the regenerated cellulose coating can cause tension lines, wrinkles, and other discontinuities in the casing.

Therefore, there is a need in the art to have a casing with the properties of fibrous casing but manufactured without a paper tube, especially if such casing could be made without any noxious side products, and preferably by use of a non-viscose process.

SUMMARY OF THE INVENTION

It now has been unexpectedly found that compounded fibrous dope compositions comprising a solution of cellulose, amine oxide, water, and a second fibrous material partially solubilized in the solution are suitable for use in making shaped cellulosic articles, such as, fibers, papers, films, and fibrous-like food casings with improved properties. The casings and other articles can now be made without the use of a paper web and are a composite system rather than a filled system. When further treated with a crosslinking agent, films and casings made of this fibrous dope composition have an initial wet modulus or degree of dimensional stability and tensile strength essentially equivalent to traditional fibrous casing. If not further crosslinked, the films and casings have a dimensional stability similar to nonfibrous casings, stretchy instead of stiff.

The compounded fibrous dope composition is made by mixing together a) a first material known as "dope", which is a cellulose source, often a wood pulp, dissolved in aqueous amine oxide, preferably NMMO, and b) a second fibrous material. This second fibrous material may or may not be the same material used in the dope, and is wetted, plasticized, and soluble in the amine oxide and water. Adjusting the energy input by limiting the shear and temperature required to completely disperse the second fiber in the dope produces a new compounded fibrous dope composition having whole, intact, as well as partially swollen, plasticized and otherwise degraded fibers of the second fibrous material. When this compounded fibrous dope is extruded into a tube or film, for example, and regenerated into a finished article, these partially solubilized fibers of the second fibrous material are visible under a light microscope. The finished article can then be treated with a crosslinking agent, increasing the dimensional stability of the article to approximately the same as, and in many cases greater than, that seen in conventional fibrous casing.

By contrast, treating a film made from a aqueous amine cellulose dope, without any second fibrous material, with a crosslinking agent does not result in a change in the stiffness and the dimensional stability properties of the film.

A method for producing the compounded fibrous dope composition has been found that consists of separately warming 1) aqueous amine oxide, preferably NMMO, until it melts, and 2) the second fibrous material that is wettable with the aqueous amine oxide and then mixing the two to form a slurry. This slurry is then mixed with an amine oxide cellulose dope solution producing a fibrous dope composition of from about 60 to about 85 weight % amine oxide, from about 5 to about 30 weight % water, and from about 1 to about 16 weight % cellulose, all based on the total weight of the dope and from about 1.5 to about 1000 weight % of the second fibrous material based on the weight of the cellulose. The fibers of the second fibrous material are evenly dispersed, but only partially dissolved or solubilized, throughout the composition. When formed into a finished article, the individual fibers of the second fibrous material are seen under a light microscope primarily as partially swollen and plasticized into the cellulose matrix, also known as the continuous phase, and otherwise degraded with some intact fibers. Other fibers are fully dissolved and therefore not visible under the microscope. In contrast, film made as above but without the second fibrous material added has no undissolved cellulose fibers that can be seen under a light microscope and instead, the film appears as a uniform, transparent sheet.

To make shaped cellulosic articles from the compounded fibrous dope composition, it can be solidified, either by leaving at room temperature for an extended period or preferably by cooling, and then reduced in size, for example, by chipping the solid block, so that small pieces can be introduced into an extruder.

Alternatively, the second fibrous material and melted dope can be co-fed to the extruder. The composition is melted in the extruder and extruded through the properly shaped die, such as, either a slit for films or an annulus for tubes, into a cellulose nonsolvent solution, such as, water, aqueous NMMO, alcohols, alcoholic NMMO, acetone, or the like, to regenerate the free cellulose and remove the aqueous amine oxide, leaving a pure cellulose article. To obtain greater dimensional stability and tensile strength characteristics, the article is then contacted with a crosslinking agent and dried or further processed as needed.

It has also been found that articles can be made of a compounded fibrous dope composition similar to above, but which differs in that the second fibrous material is not wettable or plasticized by aqueous amine oxide into the cellulose matrix. These articles are considered to be made from a "filled" system rather than a composite system. Whether or not the final articles are treated with a crosslinking agent, they will have less dimensional stability, than their conventional fibrous casings counterparts, but more stability than is found in conventional nonfibrous casings. This composition is made as is described for the composition above, but fibers that are not soluble in aqueous amine oxide and are not wettable by this solvent are used as the second fibrous material. Because of the insoluble characteristic of this material, after being made into an article, individual fibers are neither plasticized nor seen as swollen under the light microscope, but rather seen only as intact fibers.

Shaped articles made from the filled polymeric composition are made as described above, both with or without contact with the crosslinking agent.

For purposes of this specification, "nonderivatized" cellulose means a cellulose that has not been subjected to covalent bonding with a solvent or reagent but has been dissolved by association with a solvent or reagent through complexation, by van der Waals forces, hydrogen bonding, or the like.

"Nonderivatized cellulose casings" and "nonderivatized cellulosic casings" mean food casings prepared from nonderivatized cellulose as defined above.

"Derivatized cellulose casings" and "derivatized cellulosic casings" mean food casings prepared by the regeneration of a derivatized cellulose, preferably using the viscose process as described above.

"Nonsolvent" means a liquid that is not a cellulose solvent.

DETAILED DESCRIPTION OF THE INVENTION

Although the discussion of the invention as follows is generally directed to the production of a fibrous-like sausage casing, it is to be understood that any shaped or extruded article, for example, fibers, paper, films, veneers, and sponges with a rough surface, are included in the intent of the invention. The use of casing as the primary shaped article in the description as follows is for convenience only and is not meant to exclude other shaped articles as known to those skilled in the art.

The new inventive compounded fibrous dope composition is comprised of a solution of a) a first material being a cellulose dissolved in a solvent of amine oxide and water (known as "dope"), and b) a partially solubilized second fibrous material that is uniformly dispersed in the first material.

The most preferred first material, or dope, is a N-methylmorpholine N-oxide-cellulose obtained from Courtaulds Research Ltd., Coventry, England. This dope is a yellow/brown solid having a melting point of 60–70° C. The dope contains approximately 70–80% NMMO, about 10–20% cellulose, and 5–15% water. It is believed that the dope is made according to processes described in U.S. Pat. Nos. 4,145,532, 4,196,282, and 4,255,300, which are incorporated herein by reference. The dope is received as a solid at room temperature.

Any suitable cellulose may be used, but the most preferable cellulose used to produce the dope is wood pulp, primarily because it is cheap, plentiful, and relatively pure and free from contaminants such as tar and resins. As known to those skilled in the art of cellulose chemistry, another example of a useable cellulose is cotton linters.

The preferred amine oxides are cyclic tertiary amine N-oxides, and the one of choice is NMMO. However, as described in U.S. Pat. Nos. 4,142,913, 4,144,080, 4,211,574, and 4,324,593, other amine oxides including dimethylethanol amine oxide, triethylamine oxide, N-methylpiperidine-N-oxide, N-methylhomopiperidine-N-oxide, n-methylpyrollidine-N-oxide, di-N-methylcyclohexylamine-N-oxide, and dimethylbenzyl-amine-N-oxide can be used.

The second fibrous material useful for this invention includes any fibrous material that is at least partially soluble in the dope so that an article produced from the composition has individual fibers of the second fibrous material that are still visible under the light microscope. Partially solubilized fibers include some fibers that will be partially swollen and plasticized and will have composited with and become an integral part of the continuous cellulose phase or matrix. There will also be some fully intact fibers which are bonded to or held in place by the continuous phase. Finally, other fibers will have been fully dissolved by the solvent and will not be visible. The uniqueness of this invention resides in the partial plasticization of the second fiber which concurrently composites it with the continuous phase and also provides for improved dimensional stability and stiffness.

Fibrous materials that are useful in this invention include any fibrous materials that are wettable and can be at least partially plasticized by the dope-the amine oxide cellulose solution. This also includes fibrous materials that are fully soluble in the dope, provided however, that under the proper conditions of heat, work, and shear, these materials are only allowed to become partially plasticized or solubilized. A second fibrous material such as wood pulp, which as a component of the dope is known to be totally soluble in the aqueous amine oxide solvent, can be added to the dope as a second fibrous material, as long as conditions of mixing and heating are limited enough, thereby allowing the wood pulp fibers to only partially solubilize and plasticize into the continuous cellulose phase. Alternatively, the wood pulp fibers could be treated prior to mixing with the dope to inhibit complete dissolution, for example, by crosslinking.

However, of all the materials that fall within the above definition for the second fibrous material, hemp fiber is preferred. Fibrous casing made in the casing industry is produced by coating regenerated cellulose onto a sheet or tube of hemp paper. Because of this familiarity with hemp paper, applicants began testing by using small pieces of hemp paper as the second fibrous material for the present compounded fibrous dope composition. Other members of the hemp class are useful as the second fibrous material, as explained below.

The preferred material, manila hemp (abaca) is a member of the class of materials known as long vegetable fibers. These are distinguished from other vegetable cellulosic materials, as for example, cotton that is a seed hair, wood pulp, and grasses and straws, such as, bagasse and sugar cane stalks. Manila hemp is a member of the bast family, which is further subdivided to include those fibers from the stems of dicotyledonous plants including jute, ramie, and Sunn hemp. Other members of this family are the leaf fiber members, which derive from the fibrovascular tissue of certain large leaved monocotyledonous plants and include sisal, manila hemp (abaca), and phormium. The abaca plant, musa textilis, grows to a height of 12 to 25 feet or more and belongs to the mulberry family. It is grown in the Philippines and Ecuador.

Manila hemp fibers are the material of choice for the second fibrous material at this time. These fibers impart their special characteristics to the finished casing, making it very competitive with classic fibrous casing. Although it is not exactly known why the hemp fibers perform as well as they do, a possible explanation may be a combination of their size and molecular orientation as compared with that of wood pulp fibers.

These hemp fibers are generally longer than wood pulp fibers, at 2.7–6.2 mm for abaca, 2.7–4.6 mm for soft wood pulp, and 0.7–1.6 mm for hard wood pulp. The fiber length distribution curve of hemp is bimodal compared to wood pulp fibers that have a single maxima relative to fiber length. The short fiber lengths are about 75–80% of the total fiber content, with the remainder being very long and thin fibers. The longer hemp fibers increase dimensional stability and strength and the large number of very short fibers increase the cohesiveness of the very long fibers compared to traditional wood pulps.

Another difference seen between hemp fibers and wood pulp fibers resides in the morphology of the fibers. In wood fibers, cellulose polymer chains occur spirally, in 15°–45° angles relative to the cell axis, whereas in hemp fibers, these are nearly parallel with the cell axis. Thus, the parallel cellulose polymer chains in hemp give greater structure than the cellulose polymer chains in wood pulp that are at an angle with the cell axis. The molecular weights, as reflected in the comparative viscosities of hemp (1294–1781 $gm/cm^3$) and wood pulps (about 700 $gm/cm^3$), are much higher than for wood pulps.

However, the invention should not be limited to the use of hemp, as other materials are available. Examples of other useful fibrous materials include cotton linters, nylons, wood pulps with a very high molecular weight, as for example, those with a degree of polymerization higher than about 900 units, and regenerated cellulose fibers that have an increased orientation and stiffness, such as, high wet modulus rayons. Other useful regenerated cellulose fibers, for example, are those that are stabilized to swelling by crosslinking with a cellulose crosslinker, such as, formaldehyde, bifunctional aldehydes, aldehyde modified resins, carboxylic acids or epoxides, epichlorohydrin or other carbohydrate reactive crosslinking agents normally known to those skilled in the art.

A method for producing the compounded fibrous dope composition has been found that consists of separately warming 1) aqueous amine oxide, preferably NMMO, and 2) the second fibrous material that is wettable and soluble with the aqueous amine oxide, and then mixing the two to form a slurry. This warm slurry is then mixed with an amine oxide cellulose solution or dope, preferably a NMMO-cellulose dope, until the fibers of the second fibrous material are uniformly dispersed throughout the composition. The aqueous amine oxide will crystallize rapidly upon even a slight amount of cooling, making it difficult to uniformly disperse the second fibrous material and therefore it should be kept at a high enough temperature to remain molten. The mixing may be done in any sort of a mixing bowl or even by coextruding the dope and the slurry and having the extruder mix the two together.

Therefore, a fibrous dope is produced having a composition comprising from about 60 to about 85 weight % amine oxide, from about 5 to about 30 weight % water, from about 1 to about 16 weight % cellulose, all based on the total weight of the dope, and from about 1.5 to 1000 weight of the second fibrous material based on the weight of the cellulose.

Preferred amounts of cellulose are from about 5 to about 16 weight %, with the most preferred amount being from about 10 to about 16 weight %. The preferred concentration of the second fibrous material is from about 1.5 to about 100 weight %, with the most preferred being from about 25 to about 100 weight %. However, the higher concentration second fibrous material, up to about 1000 weight % based on the weight of the cellulose, allows the production of extruded paper sheets, such as electrical papers, battery separators, pattern papers, filter paper, and tea bags.

Another method of preparing the compounded fibrous dope comprises mixing together from about 60 to about 85 weight % amine oxide, from about 5 to about 30 weight % water, from about 1 to about 16 weight % cellulose, all based on the total weight of the dope, and about 1.5 to about 1000 weight % of a second fibrous material wettable with the aqueous amine oxide, based on the weight of the cellulose, thereby forming the compounded fibrous dope containing uniformly dispersed fibers of the second fibrous material. The preferred and most preferred ranges of cellulose and second fibrous material are the same as stated above.

The compounded fibrous dope composition can then be cooled and solidified, and made into a size that is useful in an extruder. The dope composition is introduced into a heated extruder and extruded into a film or tube, and passed into at least one nonsolvent bath, such as water, alcohol, or aqueous NMMO, to remove the amine oxide and to regenerate the cellulose. Contacting the shaped article with a crosslinking agent will improve the tensile strength and dimensional stability characteristics of the article.

The fibers of the second fibrous material can be seen under a light microscope, both before and after crosslinking, primarily as partially swollen, plasticized and otherwise degraded fibers, with some intact fibers present. In contrast, articles made as above, but with no second fibers added, have only fully dissolved cellulose fibers and under a light microscope, the article appears as a uniform sheet.

A shaped cellulosic article is therefore made comprising a continuous phase of nonderivatized regenerated cellulose and uniformly dispersed partially solubilized fibers of a second fibrous material bound to or composited with the continuous phase. In this article, the partially solubilized fibers are a mixture of fibers including fibers that are intact and bound to the continuous phase, fibers that are partially swollen, plasticized, solubilized, and composited with the continuous phase, and fibers that are indistinct and fully integrated into the continuous phase.

When seen under a light microscope, the second fibrous material is visible in the film as individual fibers in various stages of solubilization and plasticization. Some of the fibers are partially solubilized into the continuous phase of the film or casing. Other of these fibers are fully intact, nonsolubilized fibers. In comparison, no intact or partially dissolved fibers are seen under a light microscope in casing or film made without the second fibrous material, whether or not the final article has been contacted with crosslinking agents. Only the continuous phase of the film is seen.

A partially solubilized fibrous material can be described as a material containing fibers, some of which have at least two parts, one part that is bound to or composited with and indistinguishable from the articles continuous phase or matrix, and a second part that is visible as an intact structure resembling a fiber under a microscope. There are also a number of fibers that are not solubilized, but remain intact, while other individual fibers are seen as damaged and swollen and therefore in the beginning stages of dissolution.

Finally, there are fibers that have been totally dissolved or solubilized and are indistinguishable from the continuous phase.

A plasticized, swollen or partially solubilized fiber results from the action of the amine oxide solvent in interrupting and reducing the crystallinity or the molecular orientation of the cellulose chains. As the amine oxide interposes itself between the cellulose molecular chains, it continues to interrupt the structure, the fiber loses its integrity and becomes swollen and weakened. The plasticization, swelling, and weakening of the fibers is increased dramatically by increasing shear and heat as well as other kinds of work. The end result of this process is the total dissolution of the fiber in the amine oxide solvent. But by minimizing the added shear and heat, as for example, by the practice of this invention, the fibers can be worked just enough to disperse them in the dope and have them remain relatively whole and minimally damaged.

As the second fibrous material becomes at least partially solubilized, it becomes an integral part of the continuous cellulose phase and a composite system results. In a composite system the added material interacts molecularly with either an individual component or the whole system. This means that there is an interaction between the electrons or nucleus of one molecule and those of the other molecules and that this interaction is strong enough to change the physical or chemical behavior of the system. These interactions can take the form of, but not be limited to, hydrogen bonding, van der Waals forces, or ionic-ionic interactions.

A characteristic of an article formed from the compounded fibrous dope composition of the present invention, such as the paper, films, and tubes produced in an embodiment of this invention, is that tensile properties do not degrade as further incremental amounts of the second fibrous material are added to the dope. Instead of interrupting the continuous phase of the article made or formed on regeneration and thus reducing tensile properties of the article, the continuous phase is reinforced by the added material, as in a true composite.

Generally, the roles of the matrix or continuous phase and the reinforcement, in this case provided by the second fibrous material, fall into three categories:

1) the reinforcement has high strength and stiffness and the matrix serves to transfer stress from one fiber to the next and to produce a fully dense structure;

2) the matrix has many desirable, intrinsic physical, chemical, or engineering characteristics, and the reinforcement serves to improve certain other important engineering properties, such as, tensile strength, creep resistance, or tear resistance; and 3) the emphasis is on the economics of the process and the reinforcement in some way enhances the economic attractiveness of the matrix.

In the present invention, the reinforcement or second fibrous materials impart their own characteristic of tensile strength while adding to the dimensional stability of the film or casing. The economics are made attractive by not needing to use expensive specialty hemp paper, as does the traditional fibrous casing manufacturer.

For example, more specifically, the compounded fibrous dope composition can be made as follows. Although certain reagents and their volumes are specified below, the reagents themselves and the amounts used can be changed by those skilled in cellulose and organic chemistry, in response to needs based on the exact volumes of composite to be produced and the exact materials used, particularly as taught by the present disclosure. This example is for a composite made with dope produced from wood pulp and aqueous NMMO and a second fibrous material of hemp paper. Other reagents will of course necessitate changes in this procedure that are fully within the skill of those practicing in this art area.

In order to make an article with a uniform dispersion of a partially solubilized second fibrous material, the mechanical and thermal work done during the dispersion of the second fibrous material into the amine oxide cellulose dope must be minimized in order to maintain the integrity of the fibers. This minimization must be done in particular when wood pulp is used as the second fibrous material. It also applies to some nylons that are soluble in the cellulose solvent and all cellulosic fibers that are similar to pure wood cellulose and therefore ultimately fully soluble in the cellulose solvent. Hemp has a higher average fiber length, molecular weight and different crystalline orientation than wood pulp fibers, but it is nevertheless soluble in the NMMO solvent. It must be kept in mind that the final product must have discreet fibers present in the cellulosic film.

One way of producing the compounded fibrous dope composition and the article derived from it is as follows. Approximately 200 grams of a wetting solution containing 78 weight % of NMMO and 22 weight % of water are preheated in an about 54° C. oven for about 20 minutes as are approximately 25 grams of 0.25 inch square pieces of hemp paper. The length of time and temperature used is based on what is needed to melt the wetting solution and can be determined on a case by case basis. Generally, it has been found that the above conditions are sufficient when the amine oxide dope is made from NMMO.

The wetting solution can contain from about 60 to about 95 weight % of amine oxide, or in particular, NMMO, the remainder being water.

The hemp is pressed into the wetting solution for approximately 1 minute to assure intimate contact and complete wetting of the hemp to insure that the solvent is able to penetrate the hemps individual fibers. Then, the preheated wetting solution and the preheated hemp paper are mixed in a similarly preheated beaker. The preheating is necessary to melt the amine oxide in the wetting solution and the temperature must be maintained while mixing so that the amine oxide does not begin to recrystallize.

All of the slurry from above is mixed with 400 grams of a melted dope containing 15 weight % wood pulp, 78 weight % NMMO and 7 weight % water in a Brabender Prep-Center (C.W. Brabender Instruments, Inc., S. Hackensack, N.J., USA) for 6 minutes at 87° C. At this temperature, the composite of the dope and the second fibrous material is a flowable viscous liquid. The hemp fibers are now evenly dispersed through the composite and prior to complete cooling, the composite is a fibrous paste with a hemp content of about 30 weight % based on the weight of the wood pulp. It becomes a solid at room temperature. The composite is then recovered, cooled, for example for 24 hours at 9° C., and chipped for easy feeding into the extruder.

At this point, the compounded fibrous dope composition, or "composite dope", is available for use to make articles such as extruded papers, films, and casings. In order to do this, the chipped, cellular polymer composite is fed to a 10/1, 10", straight, single screw extruder and extruded at 125° C. through a 4" ribbon die using a slit width of 0.028". This is but one example of an extruder that can be used with the polymer composition. Other extruders well known in the art that can produce ribbons, films and tubes, are also useable with this invention. Film samples derived from this extruder are put onto 10"×3" tension hoops immediately after extrusion into a 1:1 NMMO:water bath at 28° C. for 30 minutes to regenerate the cellulose and to remove the NMMO. Next, the hoops are placed into a second water bath at 45° C., and finally into a third water bath at 60° C. The water (or nonsolvent) baths help to set the film and to remove NMMO from the film, leaving a cellulose film free of residual NMMO. Film or tubing run in commercial quantities would be handled as conventional film or tubing is handled, which would be to have the formed film or tubing run directly through the various baths.

The films now composed solely of cellulose are placed into a solution of a crosslinking reagent, such as, Kymene-557H or Kymene 450, products sold by Hercules Incorporated of Wilmington, Del., USA, which are water soluble thermosetting cationic epichlorohydrin-polyamide resins. Other crosslinking resins, such as, polyalkylenepolyamine-epichlorohydrin resins and amine polymer-epichlorohydrin resins, polyaminoamide-based epoxy curing agents, and polyfunctional aziridines are examples of chemicals that are useful for this step of the process. Other crosslinking compounds, such as formaldehyde urea and derivatized formaldehyde urea are also useful. For example, the film can be placed into a solution of 3.5 parts of Kymene 557H or Kymene 450 per 1000 parts water for about 30 minutes at room temperature, recovered, wiped to remove the excess crosslinking solution, and cured at approximately 110° C. for 45 minutes.

It is at this point, after contacting and curing the formed film or casing with a crosslinking agent, that the separate fiber strands are most visible. Crosslinking of the fibers and a resulting increase in tensile or stiffness properties appears to happen only after the film or casing is formed. In contrast, if a film is made solely from the dope and without the added second fibrous material, there is no change in tensile or stiffness properties regardless of whether or not the film is exposed to crosslinking agents. It is believed that this occurs because the crosslinking agent accumulates around and primarily coats the fibers of the partially solubilized second fibrous materials, which may explain the improvement in stiffness properties and initial modulus.

In the practice of the present invention, articles result in which the fibers of the second fibrous material are not discrete but, due to their plasticizability and solubility in the aqueous amine oxide, have become molecularly interbonded with the cellulose molecules of the continuous phase of the articles formed from the compounded fibrous dope composition. The evidence for this as shown in the Experiments that follow, and in the fact that on addition of successive amounts of higher orientation and molecular weight second fibrous material, tensile strengths of resultant hand cast films do not decrease as would be the case if these fibers were behaving as additives. Also, if the compounded fibrous dope composition was an additive system, the second fibrous material fibers would remain whole and nonsolubilized by the amine oxide of the dope, so that upon regeneration the resultant article would have only discrete, whole or unchanged fibers therein. Thus, the material behavior of the compositions made as part of practicing this invention most closely approaches that expected from composites rather than additives.

A variation of the above composition is a similar composition, but one containing as the second fibrous material only materials that are insoluble in the aqueous NMMO or amine oxide solution, and which may be use to produce a filled system article. Examples of such materials are ceramic fibers, glass fibers, certain nylons, and polyolefins. The amine oxide is selected from the group as discussed above, with NMMO being the preferred amine oxide.

As described above, a method of preparing a compounded fibrous dope composition that will be used to produce a filled system article is the same as the methods described earlier, except that the second fibrous material is insoluble in both the aqueous amine oxide used in the wetting solution or in the amine oxide cellulose dope.

Once the dope composition is made, it can be used to produce shaped articles in the same way as described above. A shaped cellulosic article can be made of this compounded fibrous dope composition comprising a continuous phase of nonderivatized regenerated cellulose and uniformly dispersed insoluble fibers of a second fibrous material bound to, but not composited with, the continuous phase.

A cellulose article regenerated from this material will not possess dimensional stability similar to or greater than that seen with fibrous casing. The shaped article may be further contacted with a crosslinking agent as previously described. Even exposing this article to a crosslinking agent will not necessarily improve the useful modulus properties of the article.

Typical articles can be fibers, papers, films, tubes, and sausage casings.

Fibrous and nonreinforced food casings made of derivatized cellulose typically contain additives or coatings to enhance food processing and food characteristics. For example, colorants are incorporated in or on the casing to make self-coloring casings, which transfer the color during processing of the food product from the casing to the food product. Liquid smokes, which impart a smoky flavor and a reddish color to the food product, are also incorporated in or coated on the casing. Peeling aids that allow the casing to be completely stripped off the cooked meat product without causing any of the meat product to be damaged, are also added to the casings.

Casings are made in a variety of colors. Dye pigments can be incorporated into the compounded fibrous dope composition prior to extrusion to produce these colored casings. At times, printing is needed on the outside of the casing. Certain dyes and pigments can be used to print whatever is needed on the casing.

As casings made from derivatized and nonderivatized cellulose are both primarily wood pulp products, and as both share similar characteristics, the nonderivatized fibrous casing as described above is believed to accept dyes, peeling agents, flavoring agents, and other agents used on sausage casings.

A series of experiments were performed to exemplify the present invention. These experiments are not designed to limit the invention, but rather to further describe it.

EXPERIMENT 1. STANDARD CASING CONTROLS

The wet 5% secant modulus test and the tensile strength test were performed on standard commercial casings. The test samples were nonfibrous cellulose food casings sold under the mark Nojax®, which is a trademark of Viskase Corporation, Chicago, Ill., USA, made of derivatized cellulose by the standard viscose method; standard fibrous casing, 14 gram fibrous casing, and 23 gram fibrous casing, all made of derivatized cellulose by the standard viscose method and coated onto various weights of hemp paper; and inedible collage casing. The results are shown in the Tables below for comparison purposes.

Tensile strength can be described as the breaking or burst strength per unit area of a material subjected to a specified dynamic load, and defined in units of pounds per inch width per mil thickness of a sample material (N. Irving Sax and R. J. Lewis, Sr, eds., Hawley's Condensed Chemical Dictionary, Eleventh Edition, 1987). The stiffness, or dimensional stability, of a film is measured by the 5% wet secant modulus test, with results reported as units of pounds per inch width per mil thickness. Tensile strength tests were performed on the Instron U4301 Universal Tester, Model Number 4301 (Instron Corporation, Canton, Mass., USA 02021). A modification of ASTM D-882 was used, where a 1"×2" sample was used with crosshead speeds of 20"/min., full scale load of 25 pounds. The breaking tensiles were calculated as pounds per 1" width per 1 mil. thickness and are presented in the Tables as PIM.

The wet 5% secant modulus test was performed by the test method of ASTM D-882, modified to be read at 5% elongation instead of 1%.

EXPERIMENT 2. DIRECT ADDITION OF HEMP PAPER TO DOPE

The purpose of this experiment was to determine if hemp in the form of small squares added to aqueous NMMO cellulose dope would provide a film with uniformly dispersed hemp fibers.

400 parts of a solid dope having 15 parts of wood pulp, 78 parts of NMMO and 7 parts of water per 100 parts of dope were melted in a Brabender Prep-Center Mixer at 102° C. and mixed for 30 minutes until uniform. Four parts of hemp paper cut into ¼" squares were added. The mixture was blended at the same temperature for 0.5 hours after which the mass was recovered, cooled for 24 hours at 9° C. and chipped. The chips were fed to a 10" 10/1 straight, single screw extruder and then through a 2" vertical ribbon die. The resultant film was hardened and the NMMO solvent removed from the film in a water bath.

Tensile strengths were measured as in Ex. 1.

The film had many almost completely dissolved, highly swollen fiber bundles, many patches of undispersed hemp and had no useful tensile properties.

EXPERIMENT 3. USE OF COTTON LINTERS

The method of Experiment 2 was followed except that 4 parts by weight of shredded cotton linters were substituted for the hemp paper. As above, no useful tensile properties were obtained for the resultant film.

EXPERIMENT 4. PRESOAKING OF THE HEMP

This experiment was performed to determine the effects of presoaking the hemp squares with the solvent, aqueous NMMO, prior to adding them to the dope.

200 parts of a solution of 78 parts NMMO and 22 parts of water per 100 parts of solution, held at 102° C. in the Brabender mixing bowl, was mixed with 25 parts of hemp paper cut into ¼" squares for 3 hours, resulting in a uniform slurry. To this was added 400 parts of the dope described in Experiment 2, but in the form of small chips. Mixing continued at the same temperature for 1 hour. The ribbon film was extruded, and upon removal of the NMMO solvent and hardening, examined under a light microscope. The resultant films did not contain visible clumps of bundles but rather the fibers were uniformly distributed, and the fibers present were highly swollen, broken or otherwise severely damaged. The film did not show any useful tensile properties.

EXPERIMENT 5. PREHEATING/SOAKING THE HEMP

This experiment was performed to determine the effects of presoaking and preheating the hemp squares with the solvent, aqueous NMMO, prior to adding them to the dope.

To 200 parts of a solution of 78 parts NMMO and 22 parts of water per 100 parts of solution was added 20 parts of ¼" squares of hemp paper, and was placed into a 54° C. oven for 4 hours with intermittent hand stirring to disperse the hemp fibers. After this time, the uniform hemp/aqueous NMMO slurry was added to 400 parts of the dope described in Experiment 2, which had been melted at 102° C. in the Brabender mixer for 0.5 hours. Mixing continued at the same temperature for 0.33 hour. The mass was recovered, cooled and solidified, chipped and extruded as in Experiment 2, except that a vertical 4" ribbon die set at 0.028" slit width was used.

The ribbon film was extruded, and upon hardening and removal of the NMMO solvent, was examined under a light microscope. The dried films contained many swollen, damaged fibers, but some large and intact fibers were observed under the light microscope.

EXPERIMENT 6. SHORTENED HEATING TIME

This experiment was done to determine if the length of time for heating the hemp solvent mixture affected the final film. The inventive compounded fibrous dope composition was made, as was a sample of noncrosslinked film of the present invention.

The method of Experiment 5 was followed except that the hemp/NMMO mixture was kept at 54° C. for only 2–3 minutes, during which time the hemp was pressed into the aqueous NMMO.

The inventive fibrous dope composition was made by dispersing these contents with 400 parts of the dope described in Experiment 2 above by mixing in the Brabender mixer for 5 minutes at 90° C. The result was a total hemp to cellulose content of 25%. The extruded film samples were put onto 10"×3" tension hoops immediately after extrusion into a water bath to set the film and remove the NMMO. The samples were dried at 125° C. for 30 minutes.

The composite films contained many whole fibers, observable under the light microscope, and to the naked eye resembled both commercial fibrous and inedible collagen casing.

They were then soaked in 30% glycerin/water prior to tensile testing. The tensile results given in Table 1 show that the film has about 70% of the wet machine direction (MD) tensile strength and about half of the wet transverse direction (TD) tensile strength of commercial fibrous casing.

EXPERIMENT 7. HIGHER CONCENTRATION OF HEMP

The method of Experiment 6 was performed except that 25 parts of hemp paper were used to produce a total hemp to cellulose content of 30%. Tensile strengths given in Table 1 show a slight improvement in tensile strengths over the film of Ex. 6, but still below those of Ex. 1 Fibrous samples.

EXPERIMENT 8. NONDERIVATIZED CONTROL

A film was made from the dope as described in Experiment 2. No second fibrous material was added. Extruded film samples were put onto 10"×3" tension hoops immediately after extrusion into a water bath to set the film and remove the NMMO. The films were soaked in a 3% aqueous glycerin solution for 0.5 hours at room temperature prior to drying. Tensile strengths given in Table 1 show lower strengths than seen in commercial nonfibrous casing, the Experiment 1 Nojax samples.

EXPERIMENT 9. CHANGED HEATING CONDITIONS

This experiment was performed to test a different heating regimen in the preparation of the inventive compounded fibrous dope composition and a noncrosslinked film from the composition.

The method of Exp. 7 was used, except that both the hemp paper and the 78% aqueous NMMO were separately preheated in a 54° C. oven for 20 minutes and then mixed in a similarly heated beaker. The hemp was pressed into the aqueous NMMO for about 2 minutes prior to mixing with the dope at 87° C. for 6 minutes. The composited dope was cooled at 9° C. for 24 hours and chipped.

The chipped composite dope was fed to the 10/1, 10", straight, single screw extruder and extruded at 125° C. through a 4" ribbon die using a slit width of 0.028 ". The samples were immediately placed into a 1:1 NMMO:water bath at 28° C. for 30 minutes, then after placing on the tension hoops, into a water bath at 45° C., and finally into a second water bath at 60° C., prior to drying at 105°–110° C. for 15–30 minutes.

The wet 5% secant modulus test was performed by the test method of ASTM D-882, modified to be read at 5% elongation instead of 1%. The results given in Table 2 show that this sample has a 5% secant modulus of about one-quarter of the commercial fibrous casing.

EXPERIMENT 9A. HIGHER HEMP CONCENTRATION

The method of Experiment 9 was used except that 50 parts of hemp, 260 parts of the 78% aqueous NMMO and 340 parts of the dope were used, giving a fibrous dope composition having about 50 weight % of hemp based on total cellulose.

The composition formed was recovered and cooled at 9° C. The solid mass was chipped and extruded as in Experiment 5, and a film produced. It is believed that the film has uniformly dispersed partially dissolved hemp fibers and is an acceptable candidate for further crosslinking studies.

EXPERIMENT 9B. HIGHER HEMP CONCENTRATION

The method of Experiment 9 is followed except that the amount of hemp in the premix slurry is 80 grams and the amount of aqueous NMMO is 400 grams. This is mixed and added to 200 grams of a melted aqueous NMMO cellulose dope that contains 5% wood pulp, 85% NMMO, and 10% water. After mixing, a compounded fibrous dope composite having about 800 weight % hemp based on the weight of the wood pulp is made. After recovering the composition, cooling, chipping, extruding, and regenerating it, a bonded hemp paper is produced that is suitable for use, for example, as tea bag paper, filter media, electrical papers, medical and sanitary uses, pattern paper for the clothing industry, and coating for food packaging.

EXPERIMENT 10. CONTROL TEST

The method according to Experiment 9 was performed without the addition of hemp paper. Wet 5% secant modulus test results are given in Table 2, showing a stronger material than that seen in Ex. 8, but not as strong as commercial fibrous casing.

EXPERIMENT 11. ADDITION OF CROSSLINKING AGENT

This experiment was performed to test the effect of a crosslinking agent on the composite film of the present invention, and thereby producing the inventive article.

The method of Experiment 9 was used, with the addition of placing the film while still on the hoops, but after all baths and drying, into a solution of 3.5 parts of Kymene 557H per 1000 parts water for 30 minutes at room temperature, and then into an oven at 110° C. for 45 minutes.

Wet 5% secant modulus test results are given in Table 2 and show a modulus more than 2 times higher than that seen in Ex. 9, and into the commercial fibrous casing range.

EXPERIMENT 12. ADDITION OF CROSSLINKING AGENT

This was performed as Experiment 11, but the crosslinking agent was Kymene 450, thereby also producing a film of the present invention. The results are similar to those seen in Ex. 11.

EXPERIMENT 13. NON-HEMP CONTAINING CONTROL CROSSLINKED

This was performed as was Experiment 10, but the films were finally placed into a 0.35% solution of Kymene 557H for 30 minutes and into an oven at 110° C. for 45 minutes. Wet 5% secant modulus test results given in Table 2 show no improvement over the nontreated control film of Ex. 10.

EXPERIMENT 14. NON-HEMP CONTAINING CONTROL CROSSLINKED

The method of Experiment 13 was followed except that Kymene 450 was used. The test results are shown on Table 2 and substantially duplicate those of Ex. 13.

EXPERIMENT 15. PRE-CROSSLINKING

The experiment was run to test if exposing the hemp fibers to a crosslinking agent prior to mixing with the dope would affect the final film.

The method of Example 9 was followed, except that the hemp fibers were soaked in a Kymene 450 solution prior to mixing with the aqueous NMMO solution.

The results are given in the Tables below showing that the modulus increased only slightly over noncrosslinked fibrous film of the present invention and the tensile strength was not even as good as that of noncrosslinked fibrous film of the present invention.

TABLE 1

Tensile Strengths* of Various Hemp Composite Films

| Ex. #/% hemp to total cellulose | Wet MD* Tensile Strength/% Elong.* | Wet TD* Tensile Strength/% Elong. |
|---|---|---|
| Ex. 1 Nojax/0 | 3.9/50 | 3.0/110 |
| Ex. 1 Fibrous/0 | 3.3/30 | 3.0/40 |
| Ex. 1 14 gm/0 | 3.6/20 | 1.4/50 |
| Ex. 1 23 gm/0 | 2.3/20 | 2.0/40 |
| Ex. 1 Collagen/0 | 1.2/50 | 1.2/41 |
| Ex. 6/25 | 2.36/22 | 1.54/50 |
| Ex. 7/30 | 2.70/20 | 2.12/90 |
| Ex. 8/0 | 3.04/24 | 1.85/25 |
| Ex. 15/30 | 2.2/47 | 1.4/— |

Tensile Strengths* are in units of pounds per inch width per mil thickness.
MD* means Machine Direction of the film.
Elong.* means the elongation, or % stretch, of the film.
TD* means the transverse direction of the film.

TABLE 2

Wet 5% Secant Moduli* of Hemp Composited Films

| Ex. #/% hemp to total cellulose | Wet 5% Modulus, MD* | Wet 5% Modulus, TD* |
|---|---|---|
| Ex. 1 Fibrous/0 | 14.0 | 3.7 |
| Ex. 1 14 gm/0 | 14.1 | 1.9 |
| Ex. 1 23 gm/0 | 11.6 | 4.2 |
| Ex. 1 Collagen/0 | 1.2 | 0.8 |
| Ex. 9/30 | 4.7 | 2.6 |
| Ex. 10/0 | 8.6 | 3.6 |
| Ex. 11/30 | 11.8 | 5.5 |
| Ex. 12/30 | 11.9 | 3.5 |
| Ex. 13/0 | 7.5 | 3.3 |
| Ex. 14/0 | 5.8 | 3.3 |
| Ex. 15/30 | 5.0 | 2.0 |

Moduli* means that wet 5% secant moduli are in units of pounds per inch width per mil thickness.
MD* is machine direction of the film.
TD* is transverse direction of the film.

The Experiments show that acceptable films made of the inventive compounded fibrous dope composition containing from 25 to 50 weight % of second fibrous material can be made. The results seen in Tables 1 and 2 show that the inventive noncrosslinked films containing a second fibrous material, Ex. 6–10, have about two-thirds of the tensile strengths of commercial fibrous casing, Ex. 1 Fibrous, and about only one-quarter of its modulus. When the hemp fibers were crosslinked with Kymene 450 prior to adding to the dope, Ex. 15, the resultant modulus increased only slightly. However, when the hemp containing films were crosslinked after extrusion, Ex. 11 and 12, the increases in moduli were dramatic, 2–4 times higher, bringing these samples into the commercial fibrous range. Additionally, these post-crosslinked fibrous samples had wet moduli and tensile strengths equal to or better than the collagen samples, Ex. 1—Collagen, or the light fibrous samples, Ex. 1–14 gm and Ex. 1–23 gram. Post-crosslinked control films without hemp, Ex. 13 and 14, did not improve in modulus as a result of treatment with Kymene.

We claim:

1. A method of preparing an extruded film using an extrudable film forming thermoplastic fibrous dope composition comprising the steps of:
   a) warming an aqueous amine oxide cellulose solvent and mixing into the warmed aqueous amine oxide a fibrous material to form a slurry;
   b) providing a molten dope composition comprising a thermoplastic solution of amine oxide cellulose solvent, water and cellulose;
   c) mixing the slurry with the molten dope composition such that the fibrous material of the slurry is uniformly dispersed in said molten dope composition and is partly solubilized by the amine oxide cellulose solvent to form an extrudable thermoplastic fibrous dope composition comprising from about 60 to about 85 wt. % amine oxide, from about 5 to about 30 wt. % water, from about 1 to about 16 wt. % cellulose, all based on the total weight of the fibrous dope composition and from about 1.5 to about 1000 wt. % of the partly solubilized fibrous material based on the weight of the cellulose in the fibrous dope composition: and
   d) extruding said fibrous dope composition to form a film.

2. A method according to claim 1, wherein the amine oxide is selected from the group consisting of N-methylmorpholine N-oxide, dimethylethanol amine oxide, triethylamine oxide, N-methylpiperidine-N-oxide, N-methylhomopiperidine-N-oxide, n-methylpyrollidine-N-oxide di-N-methylcyclohexylamine-N-oxide, and dimethylbenzylamine-N-oxide.

3. A method according to claim 1, wherein the fibrous material is selected from the group consisting of rayon, nylon, hemp, cotton linters, bagasse, sugar cane stalks, jute, ramie, sisal, wood pulp, and phormium.

4. A method according to claim 1, wherein the second fibrous material is hemp or cotton linters.

5. A method according to claim 1, wherein the cellulose is wood pulp.

6. A method according to claim 5, wherein the fibrous material is hemp and the amine oxide is N-methylmorpholine N-oxide.

7. A method according to claim 1, wherein the concentration of the cellulose is from about 5 to about 16 weight % and the concentration of the fibrous material is from about 1.5 to about 100 weight %.

8. A method according to claim 7, wherein the concentration of the cellulose is from about 10 to about 16 weight % and the concentration of the fibrous material is from about 25 to about 100 weight %.

9. A method as in claim 1, comprising washing the extruded film with a nonsolvent liquid to remove the amine oxide and to regenerate the cellulose from said solution thereby producing a fibrous cellulosic film composite.

10. A method according to claim 9 including, contacting the film composite with a crosslinking agent.

11. A method according to claim 10, wherein said film composite is selected from the group consisting of a paper, film and sausage casing.

12. A method according to claim 9, wherein said film composite is selected from the group consisting of a paper, film and sausage casing.

\* \* \* \* \*